United States Patent
Nakanishi et al.

(10) Patent No.: US 7,722,995 B2
(45) Date of Patent: May 25, 2010

(54) NON-AQUEOUS ELECTROLYTIC SOLUTION, SECONDARY BATTERY, AND ELECTROCHEMICAL CAPACITOR

(75) Inventors: Tetsuo Nakanishi, Annaka (JP); Meguru Kashida, Annaka (JP); Satoru Miyawaki, Annaka (JP); Mikio Aramata, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 887 days.

(21) Appl. No.: 11/507,529

(22) Filed: Aug. 22, 2006

(65) Prior Publication Data

US 2007/0048620 A1    Mar. 1, 2007

(30) Foreign Application Priority Data

Aug. 23, 2005   (JP) .............................. 2005-241179

(51) Int. Cl.
*H01M 6/16*    (2006.01)

(52) U.S. Cl. ...................................... 429/326; 429/324

(58) Field of Classification Search ........................ None
See application file for complete search history.

(56) References Cited

U.S. PATENT DOCUMENTS

| | | | |
|---|---|---|---|
| 6,124,062 A | | 9/2000 | Horie et al. |
| 2003/0198870 A1* | | 10/2003 | Wariishi et al. ............. 429/313 |
| 2004/0242804 A1* | | 12/2004 | Medsker et al. ............. 525/407 |

FOREIGN PATENT DOCUMENTS

| | | | |
|---|---|---|---|
| JP | 11-214032 A | | 8/1999 |
| JP | 2000-58123 A | | 2/2000 |
| JP | 2001-110455 A | | 4/2001 |
| JP | 2003-142157 A | | 5/2003 |

* cited by examiner

*Primary Examiner*—Melvin C Mayes
*Assistant Examiner*—Melissa Stalder
(74) *Attorney, Agent, or Firm*—Birch, Stewart, Kolasch & Birch, LLP

(57) ABSTRACT

A carbonate-modified silane or siloxane is combined with a non-aqueous solvent and an electrolyte salt to form a non-aqueous electrolytic solution, which is used to construct a secondary battery having improved charge/discharge characteristics.

9 Claims, No Drawings

NON-AQUEOUS ELECTROLYTIC SOLUTION, SECONDARY BATTERY, AND ELECTROCHEMICAL CAPACITOR

CROSS-REFERENCE TO RELATED APPLICATION

This non-provisional application claims priority under 35 U.S.C. §119(a) on Patent Application No. 2005-241179 filed in Japan on Aug. 23, 2005, the entire contents of which are hereby incorporated by reference.

TECHNICAL FIELD

This invention relates to a non-aqueous electrolytic solution comprising a carbonate-modified silane and/or siloxane. It also relates to energy devices using the same, specifically secondary batteries and electrochemical capacitors, and especially lithium ion secondary batteries.

BACKGROUND ART

Because of their high energy density, lithium ion secondary batteries are increasingly used in recent years as portable rechargeable power sources for laptop computers, mobile phones, digital cameras, digital video cameras, and the like. Also great efforts are devoted to the development of lithium ion secondary batteries and electric double-layer capacitors using non-aqueous electrolytic solution, as auxiliary power sources for electric and hybrid automobiles which are desired to reach a practically acceptable level as environment-friendly automobiles.

The lithium ion secondary batteries, albeit their high performance, are not satisfactory with respect to discharge characteristics in a rigorous environment, especially low-temperature environment, and discharge characteristics at high output levels requiring a large quantity of electricity within a short duration of time. On the other hand, the electric double-layer capacitors suffer from problems including insufficient withstand voltages and a decline with time of their electric capacity. Most batteries use non-aqueous electrolytic solutions based on low-flash-point solvents, typically dimethyl carbonate and diethyl carbonate. In case of thermal runaway in the battery, the electrolytic solution will vaporize and be decomposed, imposing the risk of battery rupture and ignition. Then, IC circuits are generally incorporated in the batteries as means for breaking currents under abnormal conditions, and safety valves are also incorporated for avoiding any rise of the battery internal pressure by the evolution of hydrocarbon gases. It is thus desired to further elaborate the electrolytic solutions for the purposes of safety improvement, weight reduction, and cost reduction.

Under the circumstances, polyether-modified siloxanes are of great interest because they are chemically stable and compatible with electrolytic solutions. Due to their ability to dissolve electrolytes such as $LiPF_6$ therein thoroughly and their inherent surface activity, the polyether-modified siloxanes are effective in improving the wetting of electrodes or separators. It is also known that adding only a few percents of polyether-modified siloxane to electrolytic solutions improves the charge/discharge cycle performance. However, these effects are yet insufficient. Besides, the polyether-modified siloxanes lack thermal stability and additionally, have a relatively high melting point so that they encounter some problems during low-temperature service. It would be desirable to have additives which are more stable and more compatible with electrolytic solutions.

Reference should be made to JP-A 11-214032 and JP-A 2000-58123 both corresponding to U.S. Pat. No. 6,124,062, JP-A 2001-110455, and JP-A 2003-142157.

SUMMARY OF THE INVENTION

An object of the present invention is to provide a non-aqueous electrolytic solution which offers improved charge/discharge characteristics and improved safety. Another object is to provide energy devices using the same, specifically batteries and capacitors.

DISCLOSURE OF THE INVENTION

The inventors have discovered that using a non-aqueous electrolytic solution comprising a specific carbonate-modified silane and/or siloxane in an energy device, the device is improved in charge/discharge characteristics and safety.

The present invention provides a non-aqueous electrolytic solution comprising a non-aqueous solvent, an electrolyte salt, and at least one compound selected from carbonate-modified silanes having the formula (1) and carbonate-modified siloxanes having the formula (2) as essential components.

$$R^1_{(4-x)}R^2_xSi \qquad (1)$$

$$R^1_aR^2_bSiO_{(4-a-b)/2} \qquad (2)$$

Herein $R^1$ is each independently selected from among hydroxyl radicals, and alkyl, aryl, aralkyl, amino-substituted alkyl, carboxyl-substituted alkyl, alkoxy, and aryloxy radicals of 1 to 30 carbon atoms which may be substituted with halogen atoms. $R^2$ is a carbonate radical of the formula (3):

$$R^3-O-\underset{\underset{O}{\|}}{C}-O-A- \qquad (3)$$

wherein $R^3$ is each independently an alkyl, aryl or aralkyl radical of 1 to 30 carbon atoms, which may be substituted with halogen atoms, and A is a divalent organic radical of 2 to 20 carbon atoms which may contain an ether or ester bond. The subscript x is an integer of 1 to 4, a is a positive number from 1.0 to 2.5, b is a positive number from 0.001 to 1.5, and the sum of a+b is from 1.001 to 3.

The present invention also provides a secondary battery, electrochemical capacitor, and lithium ion secondary battery comprising the non-aqueous electrolytic solution defined above.

BENEFITS OF THE INVENTION

The non-aqueous electrolytic solution comprising a carbonate-modified silane and/or siloxane is able to dissolve electrolyte salts therein and effective for improving charge/discharge characteristics.

DESCRIPTION OF THE PREFERRED EMBODIMENTS

The non-aqueous electrolytic solution of the invention contains one or more of carbonate-modified silanes having the formula (1) and carbonate-modified siloxanes having the formula (2).

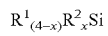 (1)

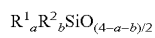 (2)

In formulae (1) and (2), $R^1$ may be the same or different and is selected from among hydroxyl radicals, and alkyl, aryl, aralkyl, amino-substituted alkyl, carboxyl-substituted alkyl, alkoxy, and aryloxy radicals of 1 to 30 carbon atoms, preferably 1 to 12 carbon atoms, more preferably 1 to 6 carbon atoms, which may be substituted with halogen atoms. Examples include, but are not limited to, alkyl radicals such as methyl, ethyl, propyl, butyl, pentyl, hexyl, heptyl, octyl, nonyl, decyl, cyclopentyl, and cyclohexyl; aryl radicals such as phenyl and tolyl; aralkyl radicals such as benzyl and phenethyl; amino-substituted alkyl radicals such as 3-aminopropyl and 3-[(2-aminoethyl)amino]propyl; and carboxy-substituted alkyl radicals such as 3-carboxypropyl. Also included are halogenated alkyl radicals in which one or more hydrogen atoms are substituted by halogen atoms, typically fluorine atoms, such as trifluoropropyl and nonafluorooctyl. Suitable alkoxy radicals include methoxy, ethoxy, propoxy, and isopropoxy. A typical aryloxy radical is phenoxy. Of these, alkyl and fluoroalkyl radicals of 1 to 6 carbon atoms are preferred. Methyl and ethyl are most preferred. It is especially preferred that at least 80 mol % of $R^1$ be methyl or ethyl.

In formulae (1) and (2), $R^2$ is a carbonate radical of straight chain structure having the general formula (3).

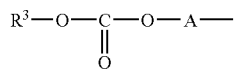 (3)

Herein $R^3$ is each independently an alkyl, aryl or aralkyl radical of 1 to 30 carbon atoms, preferably 1 to 12 carbon atoms, more preferably 1 to 6 carbon atoms, which may be substituted with halogen atoms. Examples are as exemplified above for $R^1$. Of these, alkyl and fluoroalkyl radicals of 1 to 6 carbon atoms are preferred. Methyl and ethyl are most preferred. "A" is selected from divalent organic radicals of 2 to 20 carbon atoms, preferably 2 to 11 carbon atoms, typically straight or branched alkylene radicals, which may contain an ether bond (—O—) or ester bond (—COO—). Suitable organic radicals include —(CH$_2$)$_2$—, —(CH$_2$)$_3$—, —(CH$_2$)$_4$—, —CH$_2$CH(CH$_3$)CH$_2$—, —(CH$_2$)$_5$—, —(CH$_2$)$_6$—, —(CH$_2$)$_7$—, —(CH$_2$)$_8$—, —(CH$_2$)$_{11}$—, —(CH$_2$)$_2$—CH(CH$_2$CH$_2$CH$_3$)—, —CH$_2$—CH(CH$_2$CH$_3$)—, —(CH$_2$)$_3$—O—CH$_2$—, —(CH$_2$)$_3$—O—(CH$_2$)$_2$—, —(CH$_2$)$_3$—O—(CH$_2$)$_2$—O—(CH$_2$)$_2$—, —(CH$_2$)$_3$—O—CH$_2$CH(CH$_3$)—, and —CH$_2$—CH(CH$_3$)—COO(CH$_2$)$_2$—. Also included are substituted forms of the foregoing in which one or more or all hydrogen atoms are substituted by fluorine atoms, such as fluoroether and perfluoroether radicals. Of these, vinylene and trimethylene radicals are more preferred, with the trimethylene radical being most preferred.

In formula (1), x is an integer of 1 to 4. It is preferred that x be equal to 1 or 2, and especially equal to 1, because if x is 3 or 4, the carbonate radical content is relatively increased to detract from silicon characteristics.

In formula (2), a is a positive number from 1.0 to 2.5, i.e., $1.0 \leq a \leq 2.5$, preferably $1.5 \leq a \leq 2.5$. If a is less than 1.0, the carbonate-modified siloxane may have a viscosity high enough to reduce the ion mobility in the electrolytic solution and fail to improve wetting. If a is more than 2.5, the carbonate-modified siloxane becomes less compatible with the electrolytic solution and difficult to dissolve the electrolyte in a stable manner. The subscript b is a positive number from 0.001 to 1.5, i.e., $0.001 \leq b \leq 1.5$, preferably $0.1 \leq b \leq 1.0$. If b is less than 0.001, the carbonate-modified siloxane has a lower carbonate content so that it becomes less compatible with the electrolytic solution and difficult to dissolve the electrolyte in a stable manner. If b is more than 1.5, the carbonate-modified siloxane may have a viscosity high enough to reduce the ion mobility in the electrolytic solution and fail to improve wetting. The sum of a+b is from 1.001 to 3, i.e., $1.001 \leq a+b \leq 3$, preferably $1.1 \leq a+b \leq 2.7$, and more preferably $1.5 \leq a+b \leq 2.5$.

The siloxanes of formula (2) may have any molecular structure such as straight, cyclic, branched or three-dimensional network structure. The siloxanes of formula (2) preferably have 2 to 200, more preferably 2 to 60 silicon atoms.

Illustrative examples of the carbonate-modified silanes (1) and carbonate-modified siloxanes (2) include compounds [I] through [IX] shown below.

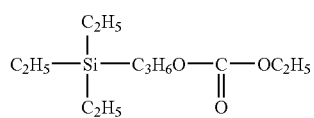 [I]

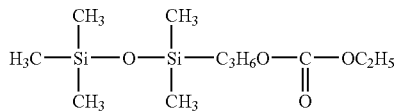 [II]

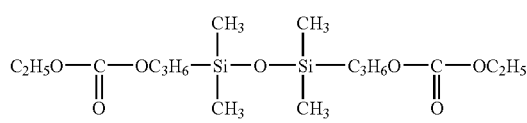 [III]

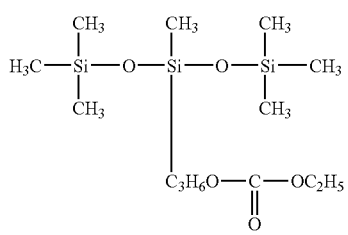 [IV]

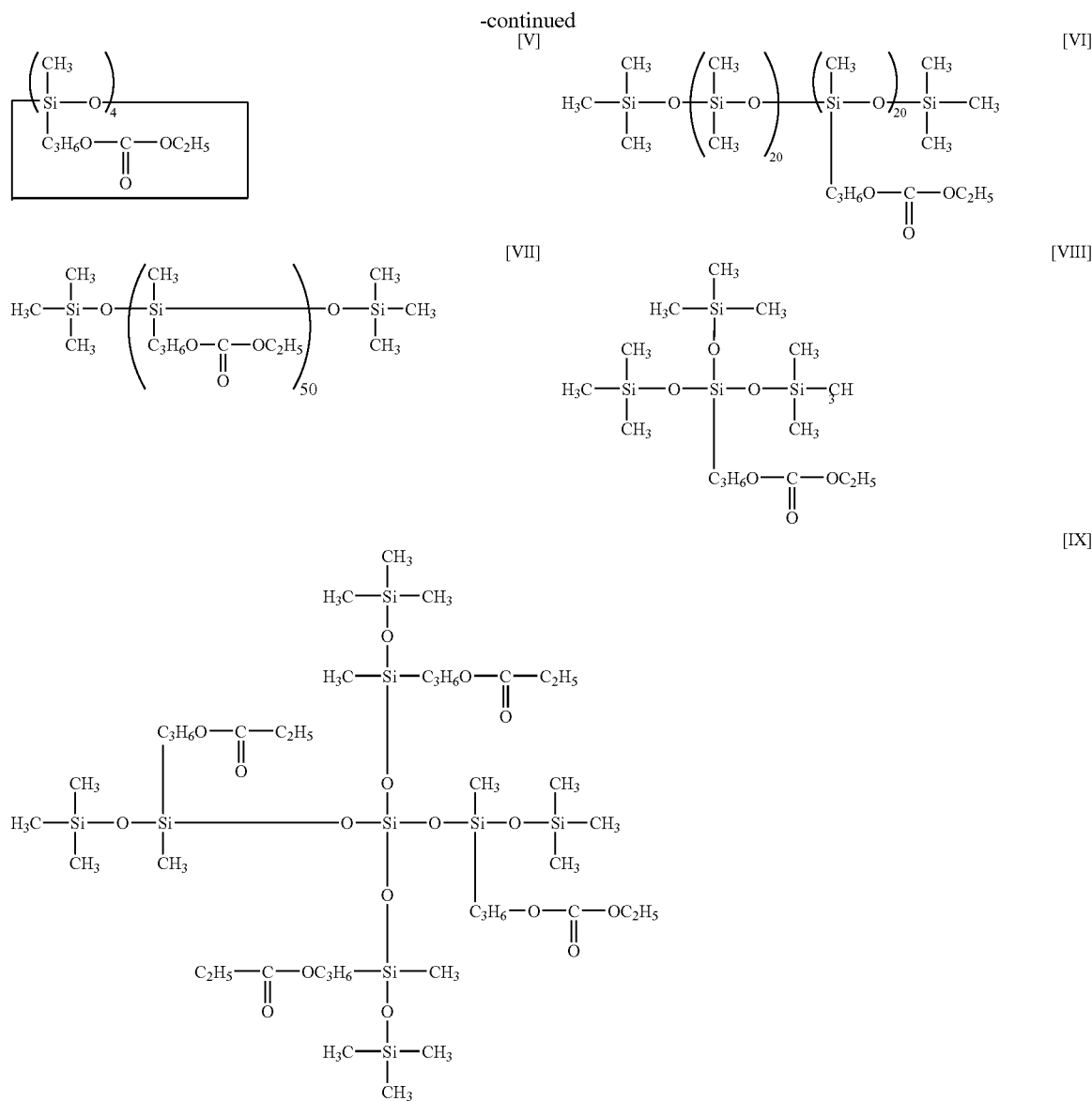

The carbonate-modified silane (1) or carbonate-modified siloxane (2) may be obtained through addition reaction of an organohydrogensilane or organohydrogenpolysiloxane having a silicon-bonded hydrogen atom (i.e., SiH radical) with a carbonate having a carbon-to-carbon double bond. For example, the carbonate-modified siloxane, referred to as compound [II], of the formula:

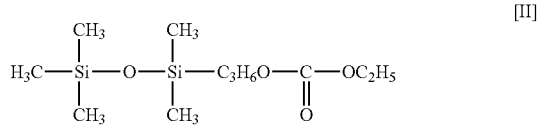

may be obtained through addition reaction of pentamethyldisiloxane (which is an SiH radical-bearing siloxane) with allyl ethyl carbonate. It is noted that the allyl ethyl carbonate is readily synthesized by dehydrochlorination reaction between commercially available ethyl chlorocarbonate and allyl alcohol.

Desirably the addition reaction is effected in the presence of a platinum or rhodium catalyst. Suitable catalysts used herein include chloroplatinic acid, alcohol-modified chloroplatinic acid, and chloroplatinic acid-vinyl siloxane complexes. Further sodium acetate or sodium citrate may be added as a co-catalyst or pH buffer. The catalyst is used in a catalytic amount, and preferably such that platinum or rhodium is present in an amount of up to 50 ppm, more preferably up to 20 ppm, relative to the total weight of the SiH radical-containing siloxane and the carbonate having a carbon-to-carbon double bond.

If desired, the addition reaction may be effected in an organic solvent. Suitable organic solvents include aliphatic alcohols such as methanol, ethanol, 2-propanol and butanol; aromatic hydrocarbons such as toluene and xylene; aliphatic or alicyclic hydrocarbons such as n-pentane, n-hexane, and cyclohexane; and halogenated hydrocarbons such as dichloromethane, chloroform and carbon tetrachloride.

Addition reaction conditions are not particularly limited. Typically addition reaction is effected under reflux for about 1 to 10 hours.

As an alternative process, the carbonate-modified siloxanes (2) can be synthesized by hydrolysis of alkoxysilanes or halogenated silanes. For example, a carbonate-modified silane is synthesized through the above-described addition reaction of trimethoxysilane ($H(MeO)_3Si$), methyldimethoxysilane ($HMe(MeO)_2Si$) and/or dimethylmethoxysilane ($HMe_2(MeO)Si$) and allyl ethyl carbonate. The carbonate-modified silane is then combined with an alkoxysilane selected from among tetramethoxysilane, methyltrimethoxysilane, dimethyldimethoxysilane and trimethylmethoxysilane and subjected to hydrolysis in the presence of sulfuric acid or methanesulfonic acid. This is also true when the alkoxy radical is ethoxy. In the event the halogenated silane is used, a carbonate-modified halogenated silane is synthesized through the above-described addition reaction and then added dropwise to a large volume of water together with a chlorosilane of proper choice. In any of these reaction routes, a solvent such as alcohol is conveniently used as a compatibilizing agent.

In the non-aqueous electrolytic solution, the carbonate-modified silane or siloxane should preferably be present in an amount of at least 0.001% by volume. If the content of carbonate-modified silane or siloxane is less than 0.001% by volume, the desired effect may not be exerted. The preferred content is at least 0.1% by volume. The upper limit of the content varies with a particular type of solvent used in the non-aqueous electrolytic solution, but should be determined such that migration of Li ions within the non-aqueous electrolytic solution is at or above the practically acceptable level. The content is usually up to 80% by volume, preferably up to 60% by volume, and more preferably up to 50% by volume of the non-aqueous electrolytic solution. Meanwhile, it is acceptable that the silane or siloxane content in the non-aqueous electrolytic solution be 100% by volume with any volatile solvent commonly used in non-aqueous electrolytic solutions of this type being omitted.

No particular limit is imposed on the viscosity of the carbonate-modified silane or siloxane. For smooth migration of Li ions within the non-aqueous electrolytic solution, the compound should preferably have a viscosity of up to 2,000 mPa-s, more preferably up to 1,000 mPa-s, as measured at 25° C. by a rotational viscometer.

The non-aqueous electrolytic solution of the invention further contains an electrolyte salt and a non-aqueous solvent. Exemplary of the electrolyte salt used herein are light metal salts. Examples of the light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

From the electric conductivity aspect, the electrolyte salt is preferably present in a concentration of 0.5 to 2.0 mole/liter of the non-aqueous electrolytic solution. The non-aqueous electrolytic solution should preferably have a conductivity of at least 0.01 S/m at a temperature of 25° C., which may be adjusted in terms of the type and concentration of the electrolyte salt.

The non-aqueous solvent used herein is not particularly limited as long as it can serve for the non-aqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolane, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing non-aqueous solvent.

Where a solid electrolyte or gel electrolyte is desired, a silicone gel, silicone polyether gel, acrylic gel, acrylonitrile gel, poly(vinylidene fluoride) or the like may be included in a polymer form. These ingredients may be polymerized prior to or after casting. They may be used alone or in admixture.

If desired, various additives may be added to the non-aqueous electrolytic solution of the invention. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

A further embodiment of the present invention is a secondary battery comprising a positive electrode, a negative electrode, a separator, and an electrolytic solution, wherein the non-aqueous electrolytic solution described above is used as the electrolytic solution.

The positive electrode active materials include oxides and sulfides which are capable of occluding and releasing lithium ions. They may be used alone or in admixture. Examples include sulfides and oxides of metals excluding lithium such as $TiS_2$, $MoS_2$, $NbS_2$, $ZrS_2$, $VS_2$, $V_2O_5$, $MoO_3$, $Mg(V_3O_8)_2$, and lithium and lithium-containing complex oxides. Composite metals such as $NbSe_2$ are also useful. For increasing the energy density, lithium complex oxides based on $Li_pMetO_2$ are preferred wherein Met is preferably at least one element of cobalt, nickel, iron and manganese and p has a value in the range: $0.05 \leq p \leq 1.10$. Illustrative examples of the lithium complex oxides include $LiCoO_2$, $LiNiO_2$, $LiFeO_2$, and $Li_qNi_rCo_{1-r}O_2$ (wherein q and r have values varying with the charged/discharged state of the battery and usually in the range: $0 < q < 1$ and $0.7 < r \leq 1$) having a layer structure, $LiMn_2O_4$ having a spinel structure, and rhombic $LiMnO_2$. Also used is a substitutional spinel type manganese compound adapted for high voltage operation which is $LiMet_sMn_{1-s}O_4$ wherein Met is titanium, chromium, iron, cobalt, nickel, copper, zinc or the like and s has a value in the range: $0 < s < 1$.

It is noted that the lithium complex oxide described above is prepared, for example, by grinding and mixing a carbonate, nitrate, oxide or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, poly-p-phenylene, polyaniline, polythiophene, polyacene, and polysulfide.

The negative electrode materials capable of occluding and releasing lithium ions include carbonaceous materials, metal elements and analogous metal elements, metal complex oxides, and polymers such as polyacetylene and polypyrrole.

Suitable carbonaceous materials are classified in terms of carbonization process, and include carbon species and synthetic graphite species synthesized by the gas phase process such as acetylene black, pyrolytic carbon and natural graphite; carbon species synthesized by the liquid phase process including cokes such as petroleum coke and pitch coke; pyrolytic carbons obtained by firing polymers, wooden materials, phenolic resins, and carbon films; and carbon species synthesized by the solid phase process such as charcoal, vitreous carbons, and carbon fibers.

Also included in the negative electrode materials capable of occluding and releasing lithium ions are metal elements and analogous metal elements capable of forming alloys with lithium, in the form of elements, alloys or compounds. Their state includes a solid solution, eutectic, and intermetallic compound, with two or more states being optionally co-present. They may be used alone or in admixture of two or more.

Examples of suitable metal elements and analogous metal elements include tin, lead, aluminum, indium, silicon, zinc, copper, cobalt, antimony, bismuth, cadmium, magnesium, boron, gallium, germanium, arsenic, selenium, tellurium, silver, hafnium, zirconium and yttrium. Inter alia, Group 4B metal elements in element, alloy or compound form are preferred. More preferred are silicon and tin or alloys or compounds thereof. They may be crystalline or amorphous.

Illustrative examples of such alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, composite Si/SiC, $Si_3N_4$, $Si_2N_2O$, $SiO_v$ (wherein $0<v\leq2$), composite SiO/C, $SnO_w$ (wherein $0<w\leq2$), $SnSiO_3$, LiSiO and LiSnO.

Any desired method may be used in the preparation of positive and negative electrodes. Electrodes are generally prepared by adding an active material, binder, conductive agent and the like to a solvent to form a slurry, applying the slurry to a current collector sheet, drying and press bonding. The binder used herein is usually selected from polyvinylidene fluoride, polytetrafluoroethylene, styrene-butadiene rubber, isoprene rubber, and various polyimide resins. The conductive agent used herein is usually selected from carbonaceous materials such as graphite and carbon black, and metal materials such as copper and nickel. As the current collector, aluminum and aluminum alloys are usually employed for the positive electrode, and metals such as copper, stainless steel and nickel and alloys thereof employed for the negative electrode.

The separator disposed between the positive and negative electrodes is not particularly limited as long as it is stable to the electrolytic solution and holds the solution effectively. The separator is most often a porous sheet or non-woven fabric of polyolefins such as polyethylene and polypropylene. Porous glass and ceramics are employed as well.

The secondary battery may take any desired shape. In general, the battery is of the coin type wherein electrodes and a separator, all punched into coin shape, are stacked, or of the cylinder type wherein electrode sheets and a separator are spirally wound.

The non-aqueous electrolytic solution of the invention is also applicable to electrochemical capacitors comprising electrodes, a separator, and an electrolytic solution, especially electric double-layer capacitors or pseudo-electric double-layer capacitors, asymmetrical capacitors, and redox capacitors.

At least one of the electrodes in the capacitors is a polarizable electrode composed mainly of a carbonaceous material. The polarizable electrode is generally formed of a carbonaceous material, a conductive agent, and a binder. The polarizable electrode is prepared according to the same formulation as used for the lithium secondary battery. For example, it is prepared by mixing a powder or fibrous activated carbon with the conductive agent such as carbon black or acetylene black, adding polytetrafluoroethylene as the binder, and applying or pressing the mixture to a current collector of stainless steel or aluminum. Similarly, the separator and the electrolytic solution favor highly ion permeable materials, and the materials used in the lithium secondary battery can be used substantially in the same manner. The shape may be coin, cylindrical or rectangular.

EXAMPLE

Examples of the present invention are given below for further illustrating the invention, but they are not to be construed as limiting the invention thereto. The viscosity is measured at 25° C. by a rotational viscometer.

Examples 1-9 and Comparative Examples 1-3

Synthesis of Carbon-to-carbon Double Bond-bearing Carbonate

A reactor equipped with a stirrer, thermometer and reflux condenser was charged with 469 g of allyl alcohol, 693 g of pyridine, and 1,200 g of THF. With stirring, 797 g of ethyl chlorocarbonate was added dropwise to the mixture while the internal temperature was controlled at −5° C. After the completion of dropwise addition, the reaction solution was aged at room temperature for 2 hours to complete the reaction. The reaction solution was neutralized with aqueous hydrochloric acid. This was combined with 1,000 ml of hexane and washed with water, whereupon the hexane layer was separated and dried over anhydrous sodium sulfate. The solution was precision distilled, collecting a fraction having a boiling point of 149-150° C. Allyl ethyl carbonate, 769 g, was obtained in a yield of 81%. It had a purity of 99.5% as analyzed by gas chromatography. On analysis by $^1$H-NMR in heavy chloroform, peaks appeared at 1.28 ppm (3H, t), 4.14 ppm (2H, q), 4.57 ppm (2H, d), 5.3 ppm (2H, m), and 5.9 ppm (1H, m). Also on analysis by $^{13}$C-NMR in heavy acetone, signals were observed at 14.4, 64.2, 68.4, 118.2, 133.2, and 155.5 ppm. On IR analysis, a strong signal of carbonyl radical was observed at 1748 $cm^{-1}$. With these data, the product was identified to be allyl ethyl carbonate.

Synthesis of Carbonate-modified Siloxane (i) A siloxane having the following formula, referred to as compound [II], was synthesized as follows.

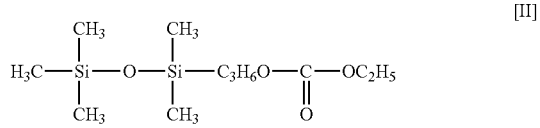

[II]

A reactor equipped with a stirrer, thermometer and reflux condenser was charged with 118 g of allyl ethyl carbonate, 100 g of toluene, and 0.05 g of a 0.5 wt % chloroplatinic acid toluene solution. With stirring at 80° C., 134 g of pentamethyldisiloxane was added dropwise to the mixture. Reaction took place while the molar ratio of terminal unsaturated radicals to SiH radicals was about 1.0. After the completion of dropwise addition, the reaction solution was aged at 80° C. for 2 hours to complete the reaction. The reaction solution was precision distilled in vacuum, collecting a fraction of 85° C./100 Pa. In this way, a carbonate-modified siloxane having formula [II] was obtained in a yield of 42%. It had a viscosity of 7 mPa-s, a specific gravity of 0.926, and a purity of 99.5% as analyzed by gas chromatography.

(ii) A siloxane having the following formula, referred to as compound [VIII], was synthesized as follows.

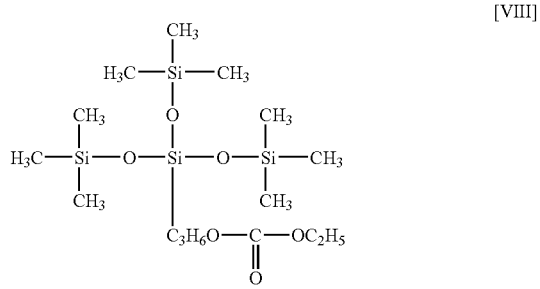

[VIII]

A reactor equipped with a stirrer, thermometer and reflux condenser was charged with 98 g of allyl ethyl carbonate, 100 g of toluene, and 0.05 g of a 0.5 wt % chloroplatinic acid toluene solution. With stirring at 80° C., 110 g of trimethoxysilane was added dropwise to the mixture. Reaction took place while the molar ratio of terminal unsaturated radicals to SiH radicals was about 0.83. After the completion of dropwise addition, the reaction solution was aged at 80° C. for 2 hours to complete the reaction. The reaction solution was distilled in vacuum, collecting a fraction of 103° C./100 Pa. In this way, a carbonate-modified trimethoxysilane was obtained in a yield of 66%.

Subsequently, a reactor equipped with a stirrer, thermometer and reflux condenser was charged with 100 g of the carbonate-modified trimethoxysilane, 124 g of trimethylmethoxysilane, and 60 g of methanol and cooled to −10° C. To the reactor was added 4 g of conc. sulfuric acid. While cooling at −10° C., 30 g of deionized water was slowly added to the mixture for hydrolysis. The mixture was stirred for 2 hours, after which it was allowed to resume room temperature, combined with toluene, and washed with water. The toluene layer was separated, dried over anhydrous sodium sulfate, and distilled in vacuum for 2 hours, collecting a fraction of 100° C./50 Pa. In this way, a carbonate-modified siloxane having formula [VIII] was obtained. It had a viscosity of 12 mPa-s and a specific gravity of 0.971.

Preparation of Non-aqueous Electrolytic Solution

Non-aqueous electrolytic solutions were prepared by dissolving the carbonate-modified silane or siloxane [I] to [IX] in a mixture of ethylene carbonate (EC) and diethyl carbonate (DEC) in the proportion shown in Table 1 and further dissolving $LiPF_6$ therein in a concentration of 1 mole/liter. For comparison purposes, a non-aqueous electrolytic solution free of the siloxane, and non-aqueous electrolytic solutions having 3% and 6% by volume of a polyether-modified silicone added instead were prepared.

TABLE 1

| | | | Modified silane or siloxane | | |
|---|---|---|---|---|---|
| | EC (vol %) | DEC (vol %) | Chemical structure | Viscosity (mPa-s) | Vol % |
| Example 1 | 47.0 | 47.0 | Compound [I] | 7 | 6 |
| Example 2 | 47.0 | 47.0 | Compound [II] | 7.5 | 6 |
| Example 3 | 47.0 | 47.0 | Compound [III] | 9 | 6 |
| Example 4 | 47.0 | 47.0 | Compound [IV] | 8 | 6 |
| Example 5 | 48.5 | 48.5 | Compound [V] | 32 | 3 |
| Example 6 | 48.5 | 48.5 | Compound [VI] | 106 | 3 |
| Example 7 | 48.5 | 48.5 | Compound [VII] | 964 | 3 |
| Example 8 | 48.5 | 48.5 | Compound [VIII] | 12 | 3 |
| Example 9 | 48.5 | 48.5 | Compound [IX] | 27 | 3 |
| Comparative Example 1 | 50.0 | 50.0 | none | — | — |
| Comparative Example 2 | 48.5 | 48.5 | polyether-modified silicone | 100 | 3 |
| Comparative Example 3 | 47.0 | 47.0 | polyether-modified silicone | 100 | 6 |

Note that the polyether-modified silicone is described in JP-A 11-214032 and has the following formula.

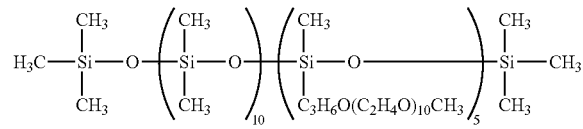

Preparation of Battery Materials

The positive electrode material used was a single layer sheet using LiCoO$_2$ as the active material and an aluminum foil as the current collector (trade name Pioxcel C-100 by Pionics Co., Ltd.). The negative electrode material used was a single layer sheet using graphite as the active material and a copper foil as the current collector (trade name Pioxcel A-100 by Pionics Co., Ltd.). The separator used was a glass fiber filter (trade name GC50 by Advantec Co., Ltd.).

Battery Assembly

A battery of 2032 coin type was assembled in a dry box blanketed with argon, using the foregoing battery materials, a stainless steel can housing also serving as a positive electrode conductor, a stainless steel sealing plate also serving as a negative electrode conductor, and an insulating gasket.

Battery Test (Cycle Performance)

The steps of charging (up to 4.2 volts with a constant current flow of 0.6 mA) and discharging (down to 2.5 volts with a constant current flow of 0.6 mA) at 0° C. and 25° C. were repeated 100 cycles. It is noted that in the charge/discharge test at 0° C., three cycles of charging/discharging at 25° C. preceded the changeover to the test at 0° C. A percentage retention of discharge capacity was calculated by dividing the discharge capacity at the 100th cycle by the initial discharge capacity. The results are shown in Table 2.

TABLE 2

| | Cycle performance (discharge capacity retention, %) | |
|---|---|---|
| | 0° C. | 25° C. |
| Example 1 | 78.6 | 91.0 |
| Example 2 | 83.2 | 91.8 |
| Example 3 | 82.8 | 92.2 |
| Example 4 | 81.6 | 93.0 |
| Example 5 | 82.5 | 92.9 |
| Example 6 | 80.5 | 93.9 |
| Example 7 | 81.1 | 94.3 |
| Example 8 | 82.2 | 94.9 |
| Example 9 | 81.0 | 93.0 |
| Comparative Example 1 | 73.0 | 88.5 |
| Comparative Example 2 | 67.2 | 89.0 |
| Comparative Example 3 | 58.0 | 89.6 |

A comparison of the discharge capacity retention after 100 cycles reveals that the carbonate-modified silane and siloxane electrolytic solutions are superior to the siloxane-free and polyether-modified silicone electrolytic solutions.

Japanese Patent Application No. 2005-241179 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A non-aqueous electrolytic solution comprising a non-aqueous solvent, an electrolyte salt, and at least one compound selected from carbonate-modified silanes having the formula (1) and carbonate-modified siloxanes having the formula (2):

wherein $R^1$ is each independently selected from the group consisting of alkyl, aryl, aralkyl, amino-substituted alkyl, and carboxyl-substituted alkyl radicals of 1 to 30 carbon atoms which may be substituted with halogen atoms;

$R^2$ is a carbonate radical of the formula (3):

wherein $R^3$ is each independently an alkyl, aryl or aralkyl radical of 1 to 30 carbon atoms, which may be substituted with halogen atoms, and A is an alkylene radical of 2 to 20 carbon atoms, x is an integer of 1 to 4, a is a positive number from 1.0 to 2.5, b is a positive number from 0.001 to 1.5, and the sum of a+b is from 1.001 to 3.

2. The non-aqueous electrolytic solution of claim 1 wherein in formulae (1) and (2), $R^1$ is an alkyl or fluoroalkyl radical of 1 to 6 carbon atoms.

3. The non-aqueous electrolytic solution of claim 1 wherein A in formula (3) is trimethylene.

4. The non-aqueous electrolytic solution of claim 1 wherein the at least one compound is present in an amount of at least 0.001% by volume of the entire non-aqueous electrolytic solution.

5. The non-aqueous electrolytic solution of claim 1 wherein the electrolyte salt is a lithium salt.

6. A secondary battery comprising the non-aqueous electrolytic solution of claim 1.

7. An electrochemical capacitor comprising the non-aqueous electrolytic solution of claim 1.

8. A lithium ion secondary battery comprising the non-aqueous electrolytic solution of claim 1.

9. The non-aqueous electrolytic solution of claim 1, wherein the at least one compound is one compound selected from the group consisting of compounds having formulae [I], [II], [III], [VI], [V], [VI], [VII], [VIII], and [IX]:

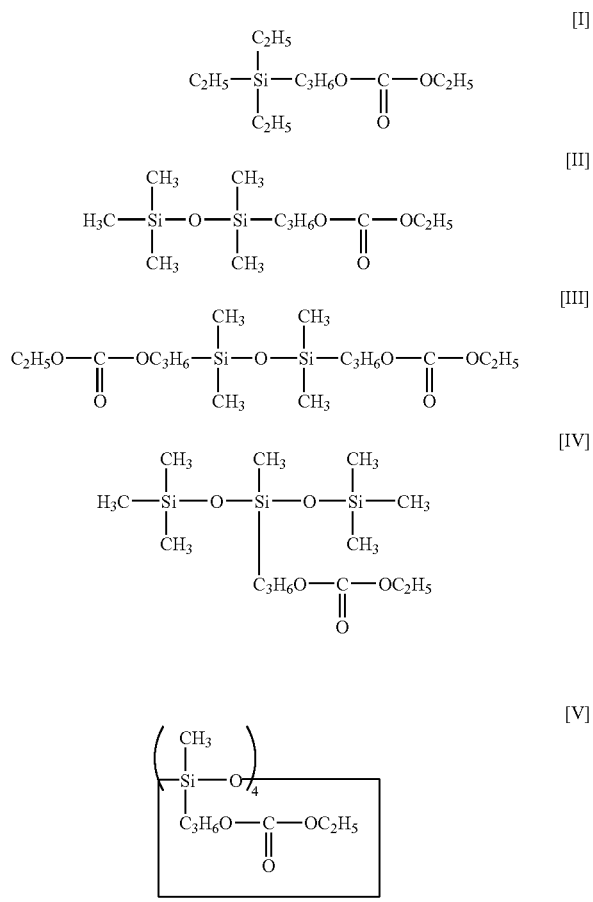
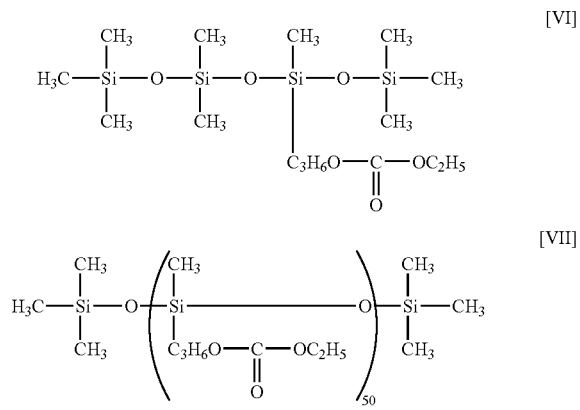
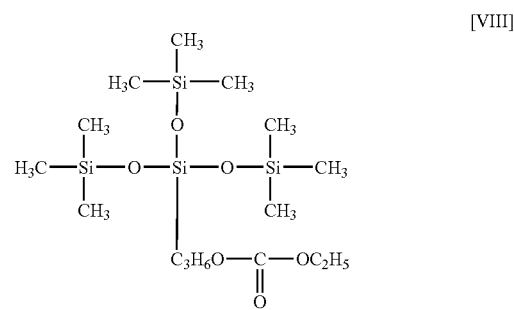

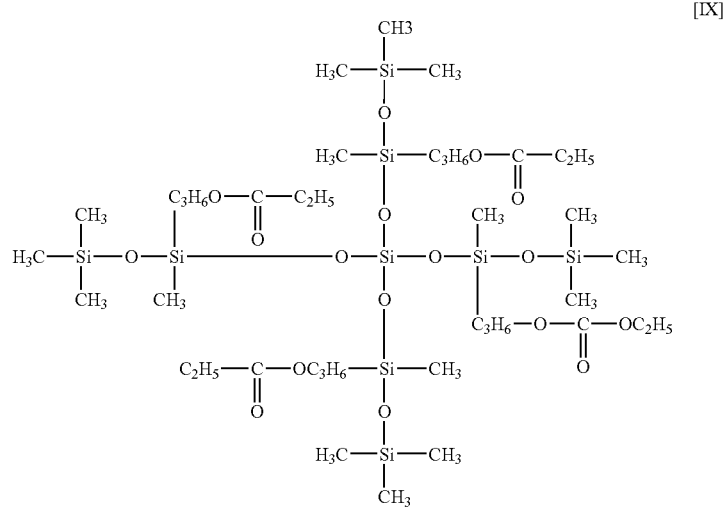
[IX]